A. R. HOFFMANN.
FEEDING APPARATUS.
APPLICATION FILED MAY 25, 1911.
1,054,548.
Patented Feb. 25, 1913.
2 SHEETS—SHEET 1.
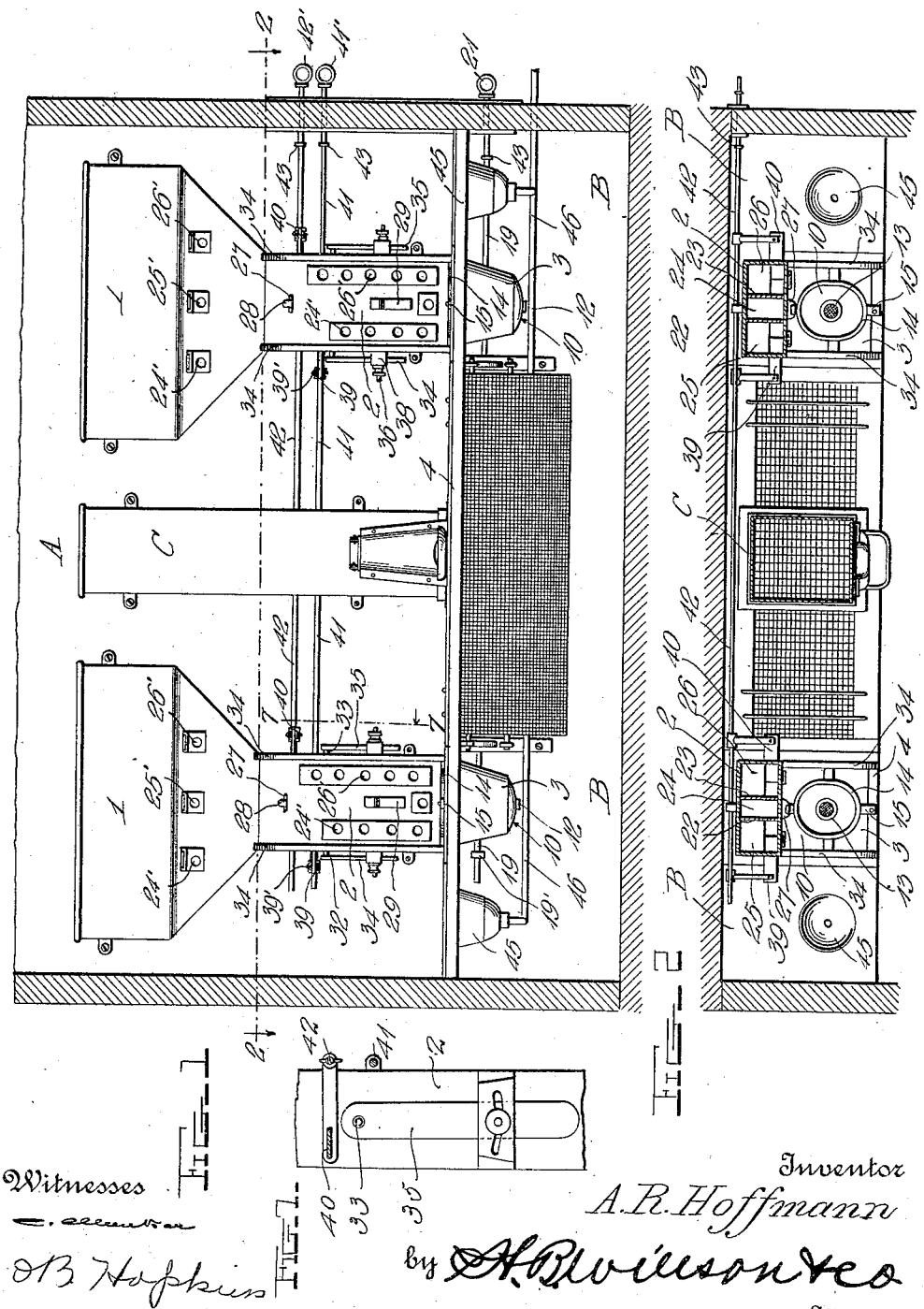
Witnesses
Inventor
A. R. Hoffmann
by A. B. Willson & Co.
Attorneys

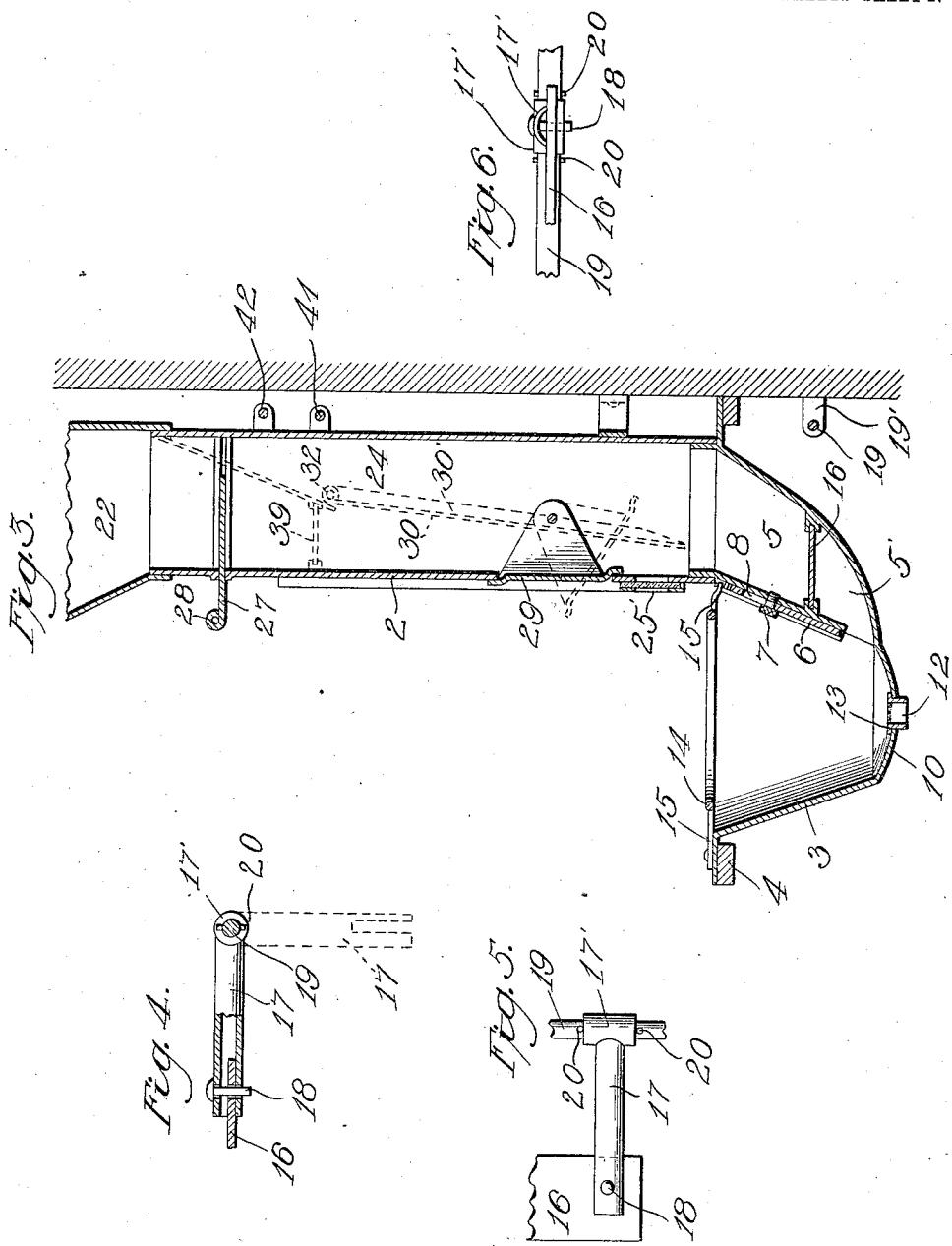

UNITED STATES PATENT OFFICE.

AUGUST R. HOFFMANN, OF ST. LOUIS, MISSOURI.

FEEDING APPARATUS.

1,054,548.  Specification of Letters Patent.  Patented Feb. 25, 1913.

Application filed May 25, 1911. Serial No. 629,475.

*To all whom it may concern:*

Be it known that I, AUGUST R. HOFFMANN, a citizen of the United States, residing at St. Louis, in the State of Missouri, have invented certain new and useful Improvements in Feeding Apparatus; and I do declare the following to be a full, clear, and exact description of the invention, such as will enable others skilled in the art to which it appertains to make and use the same.

This invention relates to improvements in feeding apparatus especially designed for feeding grain and other food stuffs to horses or other animals in measured quantities and which is designed to be used in connection with a suitable long feed supply apparatus shown and described in my companion application filed on even date herewith Serial No. 629,476.

One object of the invention is to render it possible to supply a measured quantity of food simultaneously to a number of animals and to provide means whereby the individual feeding devices may be thrown out of operation when desired in case one or more of the stalls is unoccupied.

With these and other objects in view, the invention consists of certain novel features of construction, combination and arrangement of parts as will be more fully described and claimed.

In the accompanying drawings:—Figure 1 is a transverse vertical section through a stable with this improved feeding apparatus shown in front elevation; Fig. 2 is a horizontal section taken on the line 2—2 of Fig. 1; Fig. 3 is a transverse vertical section. Fig. 4 is a detail cross sectional view of the means for connecting the slide valves with the operating rod; Fig. 5 is a top plan view thereof; Fig. 6 is an enlarged detail elevation of one of the chute valves. Fig. 7 is a detail vertical sectional view on line 7—7 of Fig. 1.

In the embodiment illustrated, a stable A is shown including two stalls, as B, with a hay feeding apparatus C, which is described and shown in my companion case above referred to, arranged between them at the head of the stalls, and each stall is equipped with my improved grain feeding apparatus which forms the subject matter of this invention. It will, of course, be understood that any desired number of stalls may be employed and equipped with the apparatus herein described and shown for simultaneously actuating the supply valves of the feed chutes in the various stalls.

Arranged at the head of each stall B is a feed containing hopper or bin 1 which may be supplied from any suitable source of supply and is normally filled with the grain or other feed with which it is desired to supply the animals in the stalls. A vertically disposed feed chute 2 is connected at its upper end with the lower end of the hopper 1 and the lower end of said chute is arranged to discharge into a feed box or trough 3 suitably supported by the manger frame 4 in convenient position for the animal using it. A downwardly and forwardly inclined passage 5 connects the lower end of the chute 2 with the bottom of said box 3, the discharge end thereof being provided with a vertically slidable closure 6 which is provided with suitable means for holding it in adjusted position, a set screw 7 being here shown secured to the front wall of passage 5 and which operates in a longitudinally arranged slot 8 formed in the closure 6. The front wall of the passage 5 also constitutes the rear wall of the feed box 3. This feed box 3 is preferably constructed as shown with downwardly and inwardly inclined side walls which merge at their lower ends into a concave rounded bottom 10. These boxes are preferably constructed of metal and of any desired or suitable depth to permit the animal feeding from it to easily reach the bottom thereof and yet of sufficient depth to prevent the food being thrown over the upper edge by the animal while eating. The bottom 10 of this box is provided with a central aperture in which a hollow tubular plug 12 is removably mounted with its upper or inner end closed by foraminous material such, for instance, as screen wire and is provided with an annular flange 13 which engages the bottom of the trough and holds the plug in operative position therein. The foraminous closure for the plug is designed to admit air for ventilating the trough and the feed contained therein and to provide for the cleaning out of the box when necessary.

The passage 5 which connects the lower end of the chute 2 with the trough 3 is preferably made integral with said trough and the side walls 5' thereof are preferably made convex on their inner faces to permit the passage of the feed thereover without danger of its adhering to said walls and thus clogging the passage or becoming sour and fouling the food.

An oval shaped ring 14 is arranged over the box 3 with its longest diameter arranged transversely of the box and which is supported in operative position by suitable straps, as 15, connected with the manger frame 4 and with said ring. This ring is preferably disposed centrally over the box 3 through which the nose and mouth of the horse or other animal must pass in order to obtain access to the food in the trough and which limits the movement of its head in the trough and thus prevents the food from being thrown over the edge and wasted.

Each of the passages 5 is provided preferably near its lower end with a sliding horizontally disposed valve 16. These valves 16 are each mounted to slide in the same direction in a plane extending transversely of the stalls and each is detachably connected to an arm 17, the front end of which is bifurcated to receive the slide 16, said slide and the bifurcated end of said arm being provided with registering apertures to receive a removable pin 18 for connecting the arm and slide together. These arms 17 are pivotally mounted on an operating bar or rod 19, each bar being preferably provided at its rear end with a sleeve 17' which is loosely engaged with the rod 19 and which is held against longitudinal movement by means of studs, as 20, which project laterally from the rod 19 at the opposite ends of the sleeves 17, as is clearly shown in Fig. 5. This rod 19, which is connected with the valves or slides 16 of all the feed boxes in the manner just described, extends through one end of the stable or other support and is provided with a handle 21 by means of which it may be moved longitudinally to open or close the valves of the various troughs. This rod is supported in any suitable manner, apertured lugs, as 19', being here shown for this purpose and which are secured to the inner end wall of the stalls, as is clearly shown in Fig. 1.

The hopper or bin 1 and the chute 2 leading therefrom are divided into three separate compartments by means of vertically disposed laterally spaced partitions 22 and 23. These partitions 22 and 23 are arranged to form a smaller middle compartment 24 with side compartments 25 and 26 preferably of the same size and which are much larger than the middle compartment, said middle compartment being designed to contain bran, meal or other soft food and the compartments 25 and 26 to hold grain of different kinds as, for instance, corn and oats. A much larger quantity of grain is usually used than of the soft food and hence it is necessary that the bins or compartments for holding the grain be larger than the soft food compartment. The middle soft food compartment 24 is provided near the upper end of the chute 2 with a transversely arranged sliding valve 27 with one end extending through a slot in the front wall of the compartment 24, said end being provided with a handle 28 which is herein shown in the form of an eye. This slide 27 is designed to be opened a suitable distance to permit the desired amount of bran to pass into the chute 2 from which it is fed into the passage 5 above the sliding valve 16 thereof. The front wall of the compartment 24 is provided with a pivotally mounted door 29 which opens inwardly and is designed for the introduction of medicine or other substances into the compartment 24 below the valve 27 thereof. This door 29 is so constructed that when it is opened a shelf-like projection extends into the compartment 24 as shown in dotted lines in Fig. 3, and when the door is closed, the medicine drops by gravity therefrom and falls into the passage 5 leading to the trough 3 where it may be mixed with the other food if desired.

Vertically disposed longitudinally arranged swinging valves 30 and 31 are mounted in the compartments 25 and 26 and are adjustable to vary the size of said compartments whereby the desired quantity of food may be measured therein. The upper ends of this apparatus are secured to pivot rods 32 and 33 which extend through the outer end walls of the compartments 25 and 26 and are secured to levers 34 and 35 arranged outside said compartments and which are adjustably secured in position by any suitable means. The means shown comprise set screws 36 projecting through curved slots 37 formed in transversely arranged straps or guides 38 secured to the outer faces of the end walls of the chute 2 whereby the positions of the partitions 30 and 31 in the compartments 25 and 26 may be varied to vary the size of said compartments. In the upper ends of the compartments, slide valves 39 and 40 are arranged transversely in the upper ends of the compartments 25 and 26 of the chute 2. Said valves operate through slots formed in the end walls of the chute 2 and all of the valves 39 of the compartments 25 of the various chutes 2 are connected with an operating rod 41 by means of pivotally mounted arms 39' which are similar in construction to the arms 17 which connect the valves 16 with the operating rod 19. The valves 40 are similarly connected with an operating rod 42, said rods 41 and 42 extending entirely across the stable at the upper ends or heads of the stalls and are mounted in suitable supports with one end projecting through one wall of the stable or other support and provided with operating handles 41' and 42'. The actuating rods 19, 41, and 42 are provided near their outer ends within the stable A with stops, as 43, for limiting their outward movement and which are spaced the proper distance to permit the valves with which the respective rods are connected to be opened to their full extent when said stops come into contact with the wall through which these rods project. The various compartments 24, 25, and 26 are provided with peep holes 24', 25' and 26' respectively which permit an inspection of the interior of these compartments to indicate whether or not any feed is contained therein.

The swinging partitions 30 and 31 are preferably reinforced by plates 30' and 31', as is clearly shown in Figs. 6 and 7, and which are designed to prevent the partitions from yielding or bending when the food bears thereagainst during the measuring of the food.

From the above description, it will be obvious that any desired feed may be fed to the boxes 3 from any one of the compartments 24 25, and 26, and that by the actuation of the proper rod all of the valves of the corresponding compartments in the various stalls may be simultaneously actuated whereby all of the animals are fed at once. The valves 16 at the lower end of the passages 5 are normally in closed position and when it is desired to feed grain from the compartment 26, the rod 42 is moved longitudinally outward to withdraw the valves 40 and permit the grain from the compartment 26 in the hopper to pass into the compartment 26 of the chute 2, the partition 31 having been first adjusted so that the desired compartment will hold the desired amount of grain to be fed. This operation may be performed at any time and the rod 42 then pushed inwardly to cut off the grain from the hopper 1 and when it is desired to feed the animals, the rod 19 is moved outwardly by means of the handle 21 which opens the slide valves 16 in the passages 5 and permits the grain to pass into the box 3, the gate or closure 6 having been first adjusted to permit the grain to be fed either rapidly or slowly from said passage 5 into said feed box 3. When it is desired to feed bran or other soft food from the middle compartment 24, the valve 27 thereof is opened by hand as it is not always desirable to feed soft food to all of the animals and, consequently, it is not deemed necessary to provide means for actuating these valves simultaneously. When one of the stalls is unoccupied and it is desired to throw the feeding valves thereof out of operation, the arms which connect the valves with the various operating rods are disconnected from said valves by withdrawing the pins 18 which will permit the arm to swing downwardly into the dotted line position shown in Fig. 4, leaving the valves in closed position. It will thus be obvious that when the actuating rods are moved, these valves will remain undisturbed. Water vessels, as 45, may be provided, if desired, and are arranged adjacent the feed boxes 3 and supported in any suitable manner having apertures in the bottom thereof with which is connected a pipe 46, said pipe being connected with any suitable water supply and is designed for supplying water to and draining it from said vessels 45.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention claimed.

I claim as my invention:—

A feeding apparatus comprising a plurality of spaced feed hoppers having chutes provided with transversely slidable valves, an actuating rod disposed parallel with and in the same horizontal plane as said valves and slidable in the same direction as said valves, arms extending at right angles from said rod and loosely mounted to swing thereon, the free ends of said arms being bifurcated to receive the valves, means for detachably connecting said arms and valves and means for holding said arms against longitudinal movement on said rod.

In testimony whereof I have hereunto set my hand in presence of two subscribing witnesses.

AUGUST R. HOFFMANN.

Witnesses:
P. A. GRISWOLD,
LORETTO M. SAGEHORN.